(12) United States Patent
Bettermann et al.

(10) Patent No.: US 7,303,352 B2
(45) Date of Patent: Dec. 4, 2007

(54) CONNECTION DEVICE

(75) Inventors: Diedrich Bettermann, Unna (DE);
Klaus Duhnke, Bochum (DE); Norbert Hesse, Bochum (DE); Gerhard Siepenkort, Lünen (DE); Adam Klabisch, Dortmund (DE)

(73) Assignee: DBT GmbH (DE)

( * ) Notice: Subject to any disclaimer, the term of this patent is extended or adjusted under 35 U.S.C. 154(b) by 0 days.

(21) Appl. No.: 11/548,929

(22) Filed: Oct. 12, 2006

(65) Prior Publication Data

US 2007/0107643 A1    May 17, 2007

(30) Foreign Application Priority Data

Oct. 12, 2005   (DE) ...................... 20 2005 016 178

(51) Int. Cl.
*F16B 7/08* (2006.01)
*F16B 9/00* (2006.01)
*F16L 41/00* (2006.01)

(52) U.S. Cl. .................... 403/188; 403/DIG. 9; 299/95
(58) Field of Classification Search ................. 299/95; 403/188, DIG. 9; 172/681
See application file for complete search history.

(56) References Cited

FOREIGN PATENT DOCUMENTS

| DE | 33 00 306 A1 | 7/1984 |
|----|--------------|--------|
| DE | 42 33 840 A  | 4/1994 |

*Primary Examiner*—Christopher J. Novosad
(74) *Attorney, Agent, or Firm*—Baker & McKenzie LLP

(57) ABSTRACT

A connection device for a plow installation, the device including a connection bracket having a basic body operable for attachment to a channel or guide section of the plow installation. A joint socket in the basic body includes a socket portion operable to receive a joint head of a boom cylinder. First and second legs are arranged in parallel and separated by a predetermined distance, with each leg including an inside portion and an outside portion. First and second supporting webs are located on the outside portions of the first and second legs, respectively. First and second bolt holes are located in the first and second legs, respectively, with a diameter of each bolt hole increasing from the inside portion of each leg to the outside portion. A joint bolt is located in the first and second bolt holes, and a clamping piece is located in each bolt hole.

11 Claims, 1 Drawing Sheet

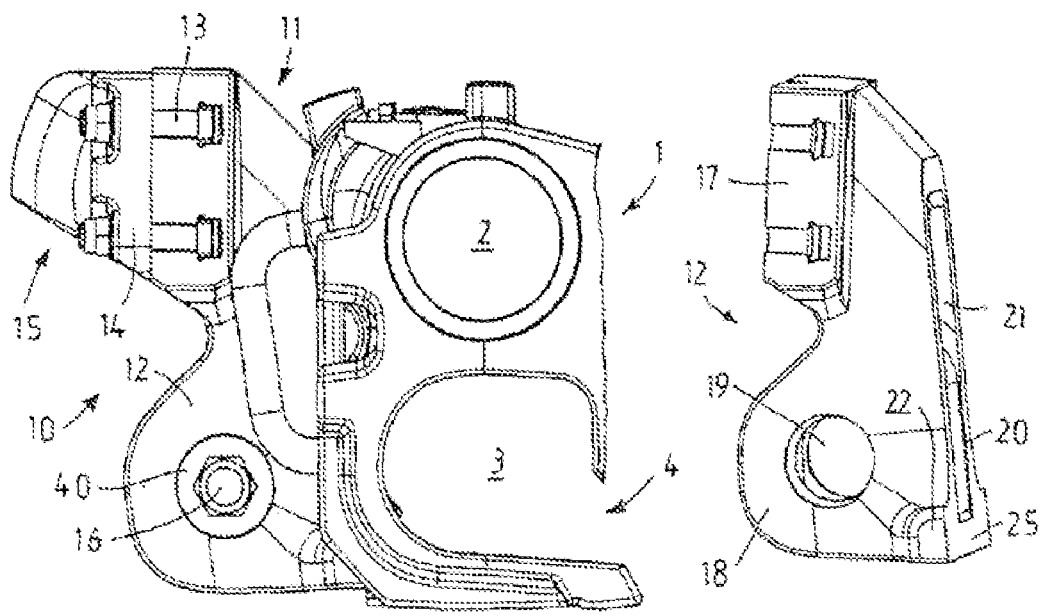
FIG 1
FIG 3
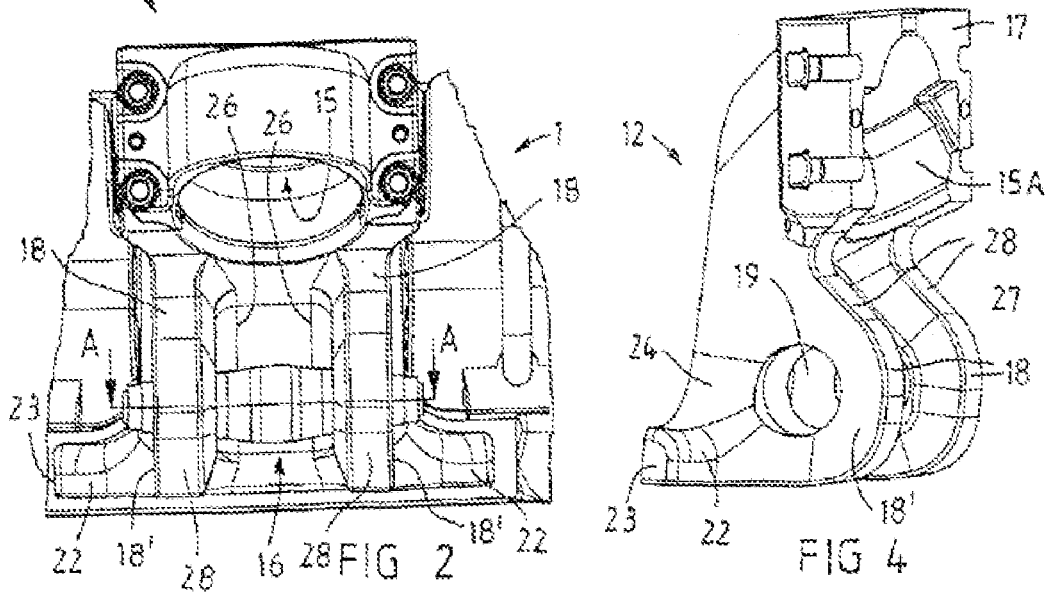
FIG 2
FIG 4
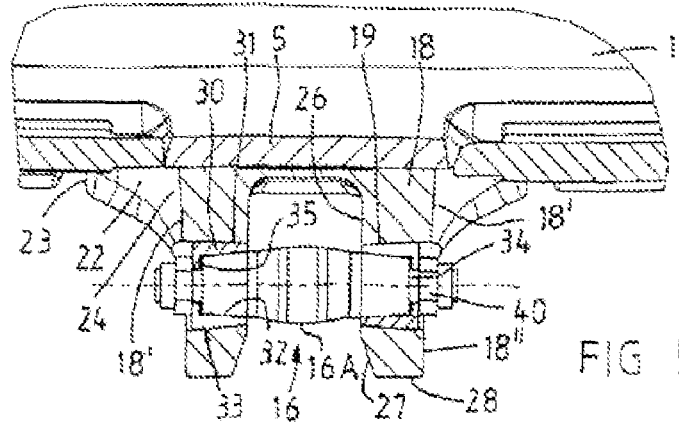
FIG 5

CONNECTION DEVICE

CROSS-REFERENCE TO RELATED APPLICATION

This application claims priority to German Patent Application No. 202005016178.0 filed on Oct. 12, 2005.

The invention relates to a connection device for plow installations with boom controls for controlling the cutting horizon of a plow, in particular coal plow, with a multipart connection bracket, of which the basic body weldable to a channel section or guide section of the plow installation is provided integrally with a socket portion of a joint socket for the articulated reception of a joint head of a boom cylinder and is provided with a fork-shaped boom connection which is formed with a height offset with respect to the joint socket and which has two vertically extending legs which are arranged parallel to one another and the insides of which lie opposite and at a distance from one another and which are provided with bolt holes for receiving a joint bolt cooperating with a head part of a boom arm.

In underground mining installations, the mining machine is guided on a longwall conveyor which is formed from conveyor sections or channel sections and which for this purpose has, where appropriate, a suitably designed plow guide. Depending on the configuration of the plow as a sliding plow or baseplate plow, the plow guide is located on the working face-side or packing-side lateral cheek structure of the channel section or guide section. The pushing of the plow installation takes place via bushing or boom arms which are buttressed on support frameworks, the head of the boom arm being connected to a boom connection of a connection bracket via a joint bolt. So that, at the same time, the plow installation can be tilted in the plane perpendicular to the stratification and can be set in its angular position with respect to the footwall horizon, boom controls with boom cylinders are used, which are buttressed, on the one hand, on the boom arm and, on the other hand, in a joint socket on the connection bracket.

A generic connection device with a connection bracket for a baseplate plow is known from DE 42 33 840 A1. The connection bracket consists of a welded structure with a multiplicity of individual elements, the joint socket which receives the head of the boom cylinder being composed of two parts screwable to one another.

A generic connection device for a sliding plow is known from DE 33 00 306 A1. There, too, a joint socket is of two-part design, one part forming a basic body on which a closing piece is fastened releasably by means of screw connections. The basic body of the connection bracket is screwed on the packing side to side panels of the channel sections. The legs for receiving the joint bolt consist of a separate fork-shaped connection bracket with two downwardly extending legs in which the bolt holes for the joint bolt are formed.

The object of the invention is to simplify the design of the connection device and, by virtue of its design, to allow the transmission of higher forces, while at the same time obtaining increased operating reliability.

This object is achieved, according to the invention, in that the basic body of the connection bracket is produced as a casting, the two legs formed integrally on the casting being provided on their outsides with integrally formed supporting webs projecting laterally from the legs, and/or the bolt holes widening conically from the inside to the outside for the use of clamping pieces cooperating with the joint bolt. By the connection bracket being produced as a casting, the design of the connection bracket overall is simplified. The laterally projecting supporting webs projecting integrally on the legs formed on the basic body ensure a lateral stabilization and support of the connection bracket welded to the channel section or guide section. At the same time, this design makes it possible that the connection bracket and consequently the entire connection device can be used both on sliding plow installations and on baseplate plow installations, and therefore different connection devices no longer have to be employed for different plow installations. By means of the clamping pieces, the joint bolt can be inserted in an operationally reliable way into and secured in the bolt holes widening conically toward the outside, thus preventing the situation where excessive wear on the bolt holes may occur due to a play of the joint bolt in the bolt holes.

According to a preferred refinement, the supporting webs formed integrally on the legs rise at least partially as far as the height of the bolt holes in the legs. The supporting webs can in this case widen continuously or progressively from their free ends toward the base portion on the outsides of the legs, in order to achieve an optimal operationally firm connection between the supporting webs and the legs. It is further advantageous if the basic body of the connection bracket has a rearwall which rises from the supporting webs as far as the top side and is closed at least toward the packing side, in order to prevent the passage of fine coal or the like through the connection bracket into the channel section of the conveyor.

The clamping pieces may preferably consist of bushes with a conical outer circumference and/or with conical bores. It is particularly advantageous if the clamping pieces consist of bushes having a longitudinal slot, in order to facilitate and improve the tension-mounting of the joint bolt in the bolt holes. The bushes may have, in particular, an inwardly projecting annular web on the wider bush base. This design has advantages particularly when both ends of the joint bolt have a threaded stem, onto which a securing nut will be or is screwed for mounting and retention. The threaded stems may, in particular, be shouldered by means of a step from the end portions of the joint bolt, so that the annular webs on the bushes can come to bear against the step. Advantageously, further, the joint bolt has a middle portion with a convex contour, so that the thickness or cross section of the joint bolt consequently increases from the end portions toward the center of the joint bolt. The convex contour of the middle portion improves the mounting functions of the boom arm on the joint bolt. Preferably, further, the joint bolt may have two end portions which taper conically from the middle portion and which cooperate with the conical bore in the bushes.

It is particularly advantageous, furthermore, if the insides of the legs run out in each case to the leg edge of the legs via a bevel or chamfer. The bevels make it possible to prevent the situation where, during operation, briquettings of fine coal may settle in the interspace between the outer surfaces of the head part of the boom arm and the insides of the legs, with the result that the service life of the connection bracket is increased considerably. The bevels are conducive to pressing out solid bodies, such as stones or briquettings, particularly in the case of horizontal pivoting movements between the head part of the boom arm and the channel section or conveyor section.

Further refinements of the connection device according to the invention may be gathered from the following description of an exemplary embodiment shown diagrammatically in the drawing in which:

FIG. 1 shows a side view of a connection device fastened to a guide section of a plow installation;

FIG. 2 shows a view from the left of the connection device from FIG. 1 connected to the channel section;

FIG. 3 shows in perspective the basic body of a connection device according to the invention;

FIG. 4 shows the basic body from FIG. 3 in perspective in a lateral front view; and FIG. 5 shows a sectional view along A-A in FIG. 2.

In the figures reference symbol 10 designates a connection device which is arranged on a guide section 1 of a mining installation, not illustrated any further. In the exemplary embodiment shown, the connection device 10 is welded to a baseplate plow guide section 1 of a baseplate plow installation, said baseplate plow guide section 1 forming the packing-side lateral cheek of conveyor channels, not illustrated, under which a plow baseplate of a baseplate plow engages when the plow is in operation. The baseplate plow guide section 1 arranged in each case on the packing side of the conveyor channel comprises two chain ducts 2 and 3 lying one above the other for guiding a plow pull chain, the lower chain guided duct 3 having a guide slot 4, open towards the working face, for the passage of the baseplate plow plate and for connecting the baseplate plow plate to a plow pull chain, not illustrated. The basic set-up of a baseplate plow guide or else of a sliding plow guide, on which the connection device 10 according to the invention could likewise be used, is known to a person skilled in the art, and therefore a detailed explanation is not given here.

The connection device 10 consists essentially of a multipart connection bracket 11 with a basic body 12 consisting of a casting and with a closing piece 14 connected or connectable via screw connections 13, by means of which basic body and which closing piece an open divided joint socket 15 for receiving the head of a boom cylinder (not illustrated) is formed, and also of a joint bolt 16 which forms a boom fastening, in order to buttress a boom arm, not illustrated, on the baseplate plow guide section 1. The boom arm, not illustrated, is in this case connected to a pushing cylinder or linkage and is buttressed on a shield-type support framework for keeping open an underground longwall. By a bushing cylinder being extended, the baseplate plow guide sections 1 and consequently the mining installation can be pushed forward in the working direction, and, by a pushing cylinder being retracted, a shield-type support framework not yet set can be drawn up, as is know to a person skilled in the art. The boom cylinder arranged between the boom arm and the joint socket 15 in the connection device 10 serves for setting the cutting horizon, so that the position of the mining installation in relation to the footwall or to the working face can be set. This, too, is known to a person skilled in the art, and therefore a further explanation of these fundamental measures is unnecessary here.

The basic body 12, consisting according to the invention of a casting, of the connection device 10, said basic body also being illustrated in detail in FIGS. 3 and 4, comprises integrally in the upper region a head part 17 with a socket portion 15A and, adjoining the head part 17 integrally, vertically running legs 18 which are spaced apart from one another and, in each case, with a height offset with respect to the socket portion 15A, are provided with bolt holes 19 arranged in alignment with one another. The basic body 12 has a rearwall 20 which connects the tow legs 18 and which, provided here with weight-reducing cavities 21, extends rectilinearly or in a planar manner from the underside of the basic body 12 as far as the head part 17, as shown particularly in FIG. 3. Integrally formed in each case on the outside 18' of the legs 18 are supporting webs 22 which project laterally from the legs 18 and which increase in thickness and in depth from the web ends 23 to the web base 24 at which they merge integrally into the legs 18. The rear side 25 of the two supporting webs 22 is planar and parallel to the rear wall 20 of the basic body 12, so that the basic body 12 can bear over a large area against a packing-side lateral cheek 5 of the guide section 1 and be welded in a stable manner there. The supporting webs 22 projecting laterally beyond the legs 18 stabilize the welded basic body 12 of the connection bracket 11 and consequently the entire connection device 10 in a state in which the latter is welded to the channel section or guide section.

The two insides 26, spaced apart from one another, of the two legs 18 merge, via bevels 27 formed peripherally around the bolt holes 19, into the leg edge 28 of the legs 18. Moreover, the two bolt holes 19 in the legs 18 widen conically from the leg insides 26 toward the leg outsides 18', as may be gathered clearly from FIG. 5. For the rotation of the fixed securing of the joint bolt 16 forming the boom arm fastening, each bolt hole 19 has inserted into it a bush 30 which is provided in a longitudinal slot 33 and has a conical outer wall 31 and a conical bore 32 and which, by means of a securing nut 40 screwed onto a threaded stem 34 on the joint bolt 16, is braced in the bolt hole 19 as a result of the cooperation of the conical part surfaces. The two securing nuts 40 in this case press against an annular web 35 projecting into the bore 32 and located on the larger base of the bush 30.

As shown particularly in FIGS. 2 and 5, the joint bolt 16 has overall a convex contour with a convex middle portion 16A and with two tapered or conical end portions which cooperate with the bushes 30 during bracing.

Numerous modifications which are to come within the scope of protection of the appended claims are evident from the foregoing description. The figures illustrate the connection device in the state in which it is welded to a guide section of a baseplate plow installation. The same connection device can also be used on sliding plough guides since it can be welded there as a whole.

The invention claimed is:

1. A connection device for a plow installation with boom controls for controlling a cutting horizon of a plow, the connection device comprising:

a multipart connection bracket including a basic body, the basic body being operable for attachment to one of a channel section or a guide section of the plow installation;

a joint socket located in the basic body, the joint socket including a socket portion and being operable to receive a joint head of a boom cylinder;

a first leg including an inside portion and an outside portion;

a second leg including an inside portion and an outside portion, the second leg being arranged parallel to the first leg and separated from the first leg by a predetermined distance;

a first bolt hole located in the first leg;

a second bolt hole located in the second leg;

a joint bolt located in the first bolt hole and the second bolt hole, the joint bolt operable for cooperation with a head part of a boom arm;

a first laterally-projecting supporting web located on the outside portion of the first leg;

a second laterally-projecting supporting web located on the outside portion of the second leg;

a first clamping piece located in the first bolt hole; and a second clamping piece located in the second bolt hole, wherein a diameter of the first bolt hole increases from the inside portion of each of the first leg to the outside portion of the first leg; and a diameter of the second bolt hole increases from the inside portion of each of the second leg to the outside portion of the second leg.

2. The connection device of claim 1, wherein a height of each of the first supporting web and the second supporting web is at least equal to a distance from an edge of the first bolt hole and the second bolt hole to a bottom edge of the respective leg.

3. The connection device of claim 1, wherein the basic body includes a closed rear wall extending from an edge of the first supporting web and the second supporting web at least to a height of the socket portion.

4. The connection device of claim 1, wherein each of the first and second clamping pieces includes at least one bush; and the at least one bush includes a conical outer circumference and a conical bore.

5. The connection device of claim 1, wherein each of the first and second clamping pieces includes at least one bush having a longitudinal slot.

6. Connection device of claim 5, wherein the at least one bush includes an inwardly-projecting annular web located on an outer portion of the at least one bush.

7. The connection device of claim 1, wherein the joint bolt includes two ends; and each of the two ends of the joint bolt include a threaded stem.

8. The connection device of claim 7, wherein each of the threaded stems includes a step.

9. The connection device of claim 1, wherein the joint bolt includes a middle portion; and the middle portion includes a convex contour.

10. The connection device of claim 9, wherein the joint bolt further includes two end portions; and each end portion tapers conically from the middle portion.

11. The connection device of claim 1, wherein the inside portion of each of the first and second supporting leg includes an angled bevel surface, the angled bevel surface being located between the respective bolt hole and an outside edge of each respective supporting leg.

* * * * *